Oct. 16, 1928.
L. REICHOLD
ELECTRIC HEATING VESSEL
Filed June 11, 1926
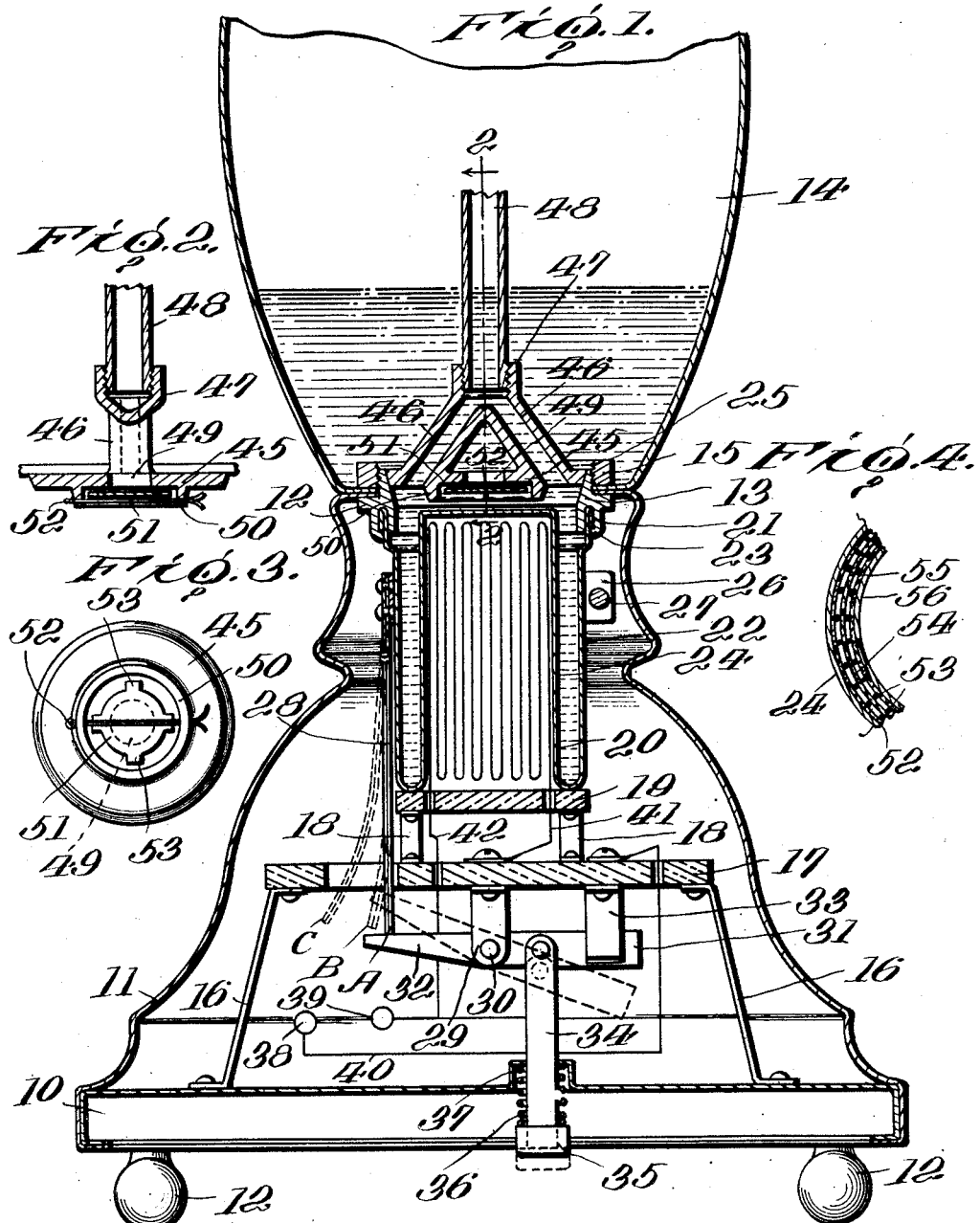
Inventor
Ludwig Reichold
By Sturtevant & Mason
Attorneys Patented Oct. 16, 1928.

1,688,286

UNITED STATES PATENT OFFICE.

LUDWIG REICHOLD, OF WINSTED, CONNECTICUT, ASSIGNOR TO THE FITZGERALD MFG. COMPANY, OF TORRINGTON, CONNECTICUT, A CORPORATION OF CONNECTICUT.

ELECTRIC HEATING VESSEL.

Application filed June 11, 1926. Serial No. 115,262.

This invention relates to improvements in electric heating vessels and more particularly concerns the design and arrangement of the electric elements for such vessels.

One of the features of this invention is the fact that the mass to be heated by the heating element is reduced to a minimum, both as regards the heat absorptive masses of the heating element itself, and as regards the quantity of water presented opposite the heating element. Particular attention has been directed to a ruggedness of construction of the heating element so that it is not subject to mechanical injury during service, which is attained primarily by enclosing it within an annular chamber constituting the water well, whereby it is unnecessary to provide a thermal insulation, and heat is conserved since the heat generated is confined within the cup of the annular well, so that the base of the vessel is preserved against damage: and secondly, during heating the structure of the heating element tends to expand, as is well known, and it is thereby brought into still closer contact with the inner walls of the annular chamber.

Not only does the supporting of the heating element in close contact with the annular chamber assist in the transmission of the heat effectively to the water contained in the annular chamber, and in the supporting of the heating element without accessory braces, but also the rapid conduction of heat from the heating element into the annular chamber itself assures a proper and efficient cooling of the heating element, so that fusing or burn-outs of the same are prevented.

In order to safeguard against damage to the structure in case of a drop of the water level, it is found preferable to employ a thermal switch. Another feature of this invention is the provision of such a switch in close proximity to the annular chamber, whereby it immediately responds to changes of temperature within the chamber, particularly in the event of a total evaporation of water from the vessel, without a time lag which might be disastrous to the heating element and the annular cup itself.

Still another feature of this invention is the arrangement of the heating element upon a support which in turn is insulated thermally from an insulating chamber which supports the switch blade of the thermal switch, and in particular, the thermal switch is separated by these two panels and the insulating layer of air between them from direct or indirect heating from the heating element of the vessel, so that the switch is well protected against damage.

With these and other objects in view as will appear in the course of the following specification, there is shown on the accompanying drawing:

Figure 1, a vertical diametral section through a coffee percolator made according to this invention.

Fig. 2, a section through the percolator tube on line 2—2 of Fig. 1.

Fig. 3, a bottom view of the percolator tube.

Fig. 4, a sectional view through the heating element and the inner wall of the tube.

On the drawing, the base 10 is formed of sheet metal with rebent edges and serves as a stiffener for the lower edge of the bottom dome 11 which protects the various elements of the heating vessel. The base and drum are preferably supported on the feet 12 so as to be out of contact with the table or other support.

The drum 11 is curved upward and inward in any suitable and artistic manner and at its upper end has an inwardly bent flange which is received against the shoulder 12 of the closing bushing 13. The reservoir 14 has a similar inwardly bent flange at its bottom and seats tightly against the flange of the dome 11, and is clamped thereto by the ring 15 which is threaded onto the bushing 13.

Rigidly fastened to the base 10 and extending upwardly therefrom are the legs 16 which support at their upper end an insulating panel 17, which in turn has the legs 18 to support an upper insulating panel 19, which in turn supports the heating element 20. This assembly is well braced and is very rigid in position.

The bushing 13 has the upper end 21 of the outer member 22 of an annular cup sealed into it by crimping over a projecting flange 23, so as to form a water-tight joint. The inner member 24 of the annular cup is closed at the top by a plate 25 which is integral therewith. The heating element 20 is contained entirely within the inner member 24 of this annular cup, so that the heating element is surrounded by a water jacket containing fluid from the reservoir 14. The quantity of fluid contained within this jacket is relatively small, so that a quick heating results: on the other hand, sufficient fluid is contained in this annular cup to absorb the heat radiating from the heating element and to prevent passage of this heat by direct radiation to the dome 11. It will be noted that radiation occurs only from the wall of the outer member 22 forming this annular cup.

A split ring 26 is clamped about the outer wall 24 of the cup by a screw 27, and carries the bimetallic bar 28 of the well known thermostatic type adjacent the wall 22. It will be understood that as the water in the vessel 22 is heated, this bimetallic bar is caused to curl outwardly at its lower end. When the entire device is cold the lower end is in approximately the position shown at A; when the water is heated to the boiling point it is in the position shown at B, and when the water has substantially boiled away so that overheating occurs, it moves to a position such as shown at C.

Rigidly mounted on the insulating panel 17 are the pivot lugs 29 carrying a pivot 30 to support the switch blade 31, which extends beyond the pivot 30 in the arm 32 which is presented beneath the bottom edge of the bimetallic bar 28. Likewise rigidly mounted upon the insulating panel 17 are the contact lugs 33, into engagement with which the switch blade 31 may be brought as shown in full lines in the drawing. Pivoted to the switch blade 31 intermediate the pivot point 30 and the contacts 33 is the reseating plunger 34 which projects downwardly through the base plate 10 and has an enlarged head 35 at its lower end. A coil spring 36 is disposed about the rod 34 and is preferably received at its upper end within a depression 37 formed in the base plate 10 for the purpose of guiding this spring. This spring constantly tends to draw the spring blade from the position shown in full lines to that shown in dotted lines. When the thermostatic bar 28 moves to the position C, the spring 36 pulls the plunger 34 and therewith the end 31 of the switch blade downward into the position shown in dotted lines, whereby the circuit through the heating element is quickly broken. By pressing upward with a finger upon the enlarged head 34, access having been gained beneath the lower edge of the dome 11 and the base plate 10, the switch blade is again returned to the position shown in full lines.

The electrical connection of this heat vessel extend from the terminals conventionally represented at 38 and 39 as follows: terminals 38, wire 40, contact 33, switch blade 31, pivot lugs 29, wire 41, and heating element 20, wire 42, back to the the terminal 39.

The internal surface of the bushing 13 is conical at its upper portion to tightly receive the correspondingly shaped stopper disk 45 which has formed integrally therewith the upwardly convergent branch pipes 46 which merge at the upper ends into the internally threaded connection 47 which receives the percolator tube 48 proper. The disk 45 also has a central aperture 49 with an annular downwardly projecting flange 50 around it. The valve plate 51 is loosely received within this flange, and is held in position for example by a cotter pin 52, which is passed through apertures in the flange. The valve plate 51 is preferably provided with the projecting guide lugs 53 which center it within the flange.

The operation of this latter assembly during heating is well known. The liquid from reservoir 14 flows downward through the aperture 49 onto the plate 25, and thence flows into the annular well between the walls 22 and 24, in which it is heated, and passes upward and out through the branch pipes 46 and the percolator tube 48. The valve 51 prevents a reverse flow.

In order to reduce the mass of material of the heating element 20 which must be heated before radiation occurs, the metal wall 24 constituting the inner walls of the annular cup receives a thin sheet of mica 52 as an insulation. The heating element is then made up by winding a resistance wire or ribbon 53 around a card 54 of mica in such a manner that the wire or ribbon will run parallel to the axis of the cylinder to be formed by bending this mica card. This mica card 54 is then bent into a cylinder of somewhat lesser diameter than the inner wall of the insulation sheet 52, and slipped into place in the tube. A second sheet of mica 55 is then likewise bent into a circle and slipped within the inserted heating element; and finally a sheet of spring metal 56 is likewise bent into a cylinder and slipped within the mica sheet 54, and serves by the resiliency to force the several layers outward and into close contact with the wall 24, to assure a good conduction of the heat to the wall. The cylinder formed by this metal sheet has a slit down its side to prevent eddy currents causing loss therein; such loss in the walls of the liquid well are not harmful, as the heat caused thereby is transmitted to the liquid.

It is obvious that the invention is not limited to the form illustrated, but may be modified within the scope of the appended claims.

I claim:

1. In a liquid heating vessel, a reservoir, an outer cup communicating with said reservoir, an inner cup cooperating with said outer cup to define an annular liquid well, an annular electric heating element located within said inner cup, and means to hold said element closely against the inner side wall of said well.

2. In a liquid heating vessel, a reservoir, an annular electric heating element located beneath said reservoir, a member providing an annular liquid well in communication with said reservoir, said well surrounding said element, and means to force said element radially against the inner side wall of said well.

3. In a liquid heating vessel, a base, a bottom dome connected to said base, a reservoir, means to clamp said dome and reservoir together, and a liquid well fastened to said means, said well, said means and said reservoir forming a liquid-tight assembly.

4. In a liquid heating vessel, a base, a bottom dome connected to said base, a reservoir, a threaded bushing and ring to clamp said dome and reservoir together, and a liquid well permanently assembled in sealed and supporting relation to said bushing.

5. In a liquid heating vessel, a bottom dome, an annular liquid well in said dome, a supporting plate mounted rigidly with regard to said dome, an annular electric heating element within the central space of said annular well, and means to hold said element closely against said cup whereby said plate and said well enclose and prevent radiation of heat from said element onto said dome.

6. In a liquid heating vessel, an annular liquid well, an electric heating element within the central space of said annular well, a spring-opened switch in the circuit of said element, and a thermostatic element directly attached to the outer wall of said well and including a bimetallic bar normally holding the switch blade against opening but adapted to move under the action of heat at a predetermined temperature to release said switch for opening.

7. In a liquid heating vessel, a base, a plate supported on said base, a switch blade mounted beneath said plate, a plunger connected to said switch blade and passing through said base and having an enlargement thereon, and a spring mounted about said plunger between said enlargement and said base.

8. In a liquid heating vessel, a base, a liquid well mounted rigidly on said base, a plate supported on said base beneath said well, an electric heating element on said plate in proximity to said well, a switch blade pivoted beneath said plate, a plunger pivoted to said blade and passing through said base, a spring surrounding said plunger beneath said base, and means on said plunger to maintain said spring.

9. In a liquid heating vessel, an annular liquid well comprising inner and outer walls, an electric heating element mounted within the inner wall, means to press said element against said wall, a split ring clamped about said outer wall, and a thermostatic bar supported by said ring in close proximity to said outer wall.

10. In a liquid heating vessel, a base, an annular liquid well comprising inner and outer walls, an electric heating element mounted within the inner wall, means to press said element against said wall, a split ring clamped about said outer wall, a thermostatic bar supported by said ring in close proximity to said outer wall, said well being rigidly supported on said base, a plate supported on said base beneath said well to maintain said element in position, and a spring-opened switch blade pivoted beneath said plate and thereby protected from radiation from said element, said bar holding said blade normally closed.

11. In a liquid heating vessel, a reservoir having an aperture in its bottom, a supporting dome having an aperture in its top, means to clamp and seal said reservoir and dome with regard to each other, a member comprising inner and outer walls forming an annular liquid heating chamber, said outer walls being seated on and sealed with regard to said clamping means, and an electric heater within said inner walls, said annular chamber protecting said dome from the action of said heater.

12. In a liquid heating vessel, an annular liquid well comprising inner and outer walls, an electric heating element mounted within the inner wall, a thermostatic bar, means to support said bar in close proximity to said outer wall, and a current opening device controlled by said bar, said annular well protecting the bar from direct heating by said element, so that the action of said bar responds to the heating of the contents of said well.

13. In a liquid heating vessel, a reservoir, an annular liquid well communicating with said reservoir, a heating element located within the inner cup of said well and comprising a thin annulus of low heat capacity, and means to hold said annulus closely against said cup, the total heat capacities of said cup and contents, of said heater and of said means being small in proportion to the heat capacity of said reservoir and its contents, so that a low lag in the heating is attained.

14. In a liquid heating vessel, a reservoir, an outer cup communicating with said reservoir, an inner cup cooperating with said outer cup to define an annular liquid well beneath said reservoir, a member closing said well at its top and having a percolation tube mounted therein to form a communication between said annular well and the top of said reservoir and having a bifurcated lower end with passages through said member, said member having a valved opening for communication between the bottom of said reservoir and said annular well.

15. In a liquid heating vessel, a reservoir, a heating well beneath said reservoir and communicating therewith, electric means for heating the said well and contents, a switch in the circuit of said means biased to interrupt energization of the same, a thermostatically moved member supported by said well and having its moved portion extending into blocking relation with said switch, said thermostatic member maintaining the blocking of said switch in closed position so long as the said well is maintained at not more than the boiling point of the liquid and being adapted to release said switch for its automatic opening when said well and contents attain a temperature above the boiling point.

16. In a liquid heating vessel, a reservoir, an annular liquid heating well below and communicating with said reservoir, an electric heating element in the recess of said annular well, means to support said element within said recess and to prevent the radiation of heat therefrom, a thermostatic element supported on the exterior of said well so that it is protected by said well and means against heat radiated by said element and responds only to the temperature of said well and contents, and a switch in the circuit of said element and biased for normal opening, said thermostatic element blocking the opening of said switch until said well and contents reach a higher temperature than the boiling point of the liquid.

17. In a liquid heating vessel, a reservoir, an outer cup, an inner cup cooperating with said outer cup to define an annular liquid well, said well being located beneath said reservoir, a discharge pipe at the upper end of said well leading upward in said reservoir, an inlet conduit at the bottom of said reservoir communicating with said well, said well being of small capacity in comparison with said reservoir, an annular electric heating element located within said inner cup, and means to hold said element closely against the inner wall of said well, so that the contents of said well may be rapidly brought to high temperature and caused to pass upward in said discharge conduit toward the top of said reservoir.

18. In a liquid heating vessel, a reservoir, a member located beneath the reservoir and providing a vertical annular liquid well closed at the bottom and in communication at its top with said reservoir, said well having a deep cavity of small radial thickness so that a small quantity of liquid may be rapidly heated therein, an annular electric heating element located within the central portion of said member, and means to force said element radially outward and to hold it in close contact with the inside wall of said annular well.

In testimony whereof, I affix my signature.

LUDWIG REICHOLD.